United States Patent [19]

Tanaka

[11] Patent Number: 5,049,091

[45] Date of Patent: Sep. 17, 1991

[54] EQUIPMENT FOR CONNECTION TO ELECTRONIC EQUIPMENT

[75] Inventor: Masato Tanaka, Tokyo, Japan

[73] Assignee: Sony Corporation, Tokyo, Japan

[21] Appl. No.: 622,829

[22] Filed: Dec. 5, 1990

[30] Foreign Application Priority Data

Dec. 6, 1989 [JP] Japan .................................. 1-316720

[51] Int. Cl.⁵ .......................................... H01R 13/00
[52] U.S. Cl. ................................................... 439/500
[58] Field of Search .............................. 439/500, 628

[56] References Cited

U.S. PATENT DOCUMENTS 4,607,904 8/1986 D'Alessandro et al. ............ 439/500
4,873,160 10/1989 Miyazaki et al. .................... 439/500
4,957,831 9/1990 Meredith et al. .................... 439/500

Primary Examiner—Joseph H. McGlynn
Attorney, Agent, or Firm—Hill, Van Santen, Steadman & Simpson

[57] ABSTRACT

An electronic equipment for connection, connected to a tape recorder, video equipment or the like electronic equipment for exchange of information signals with such electronic equipment has a connecting section introduced into a battery housing section of the latter electronic equipment. A plurality of connecting terminals are provided in the connecting section to reduce the size of the electronic equipment to protect the connection terminals.

18 Claims, 13 Drawing Sheets

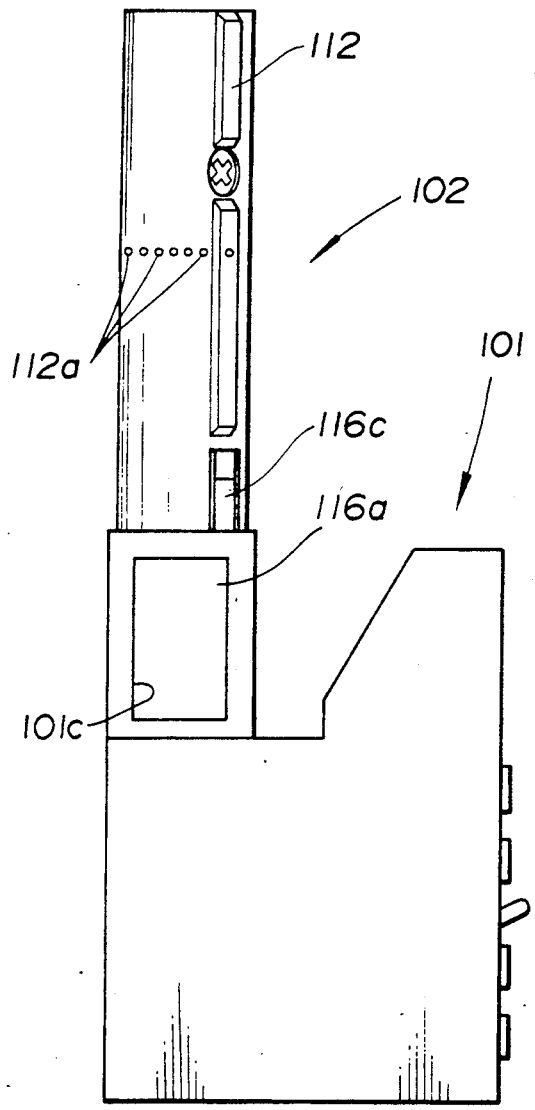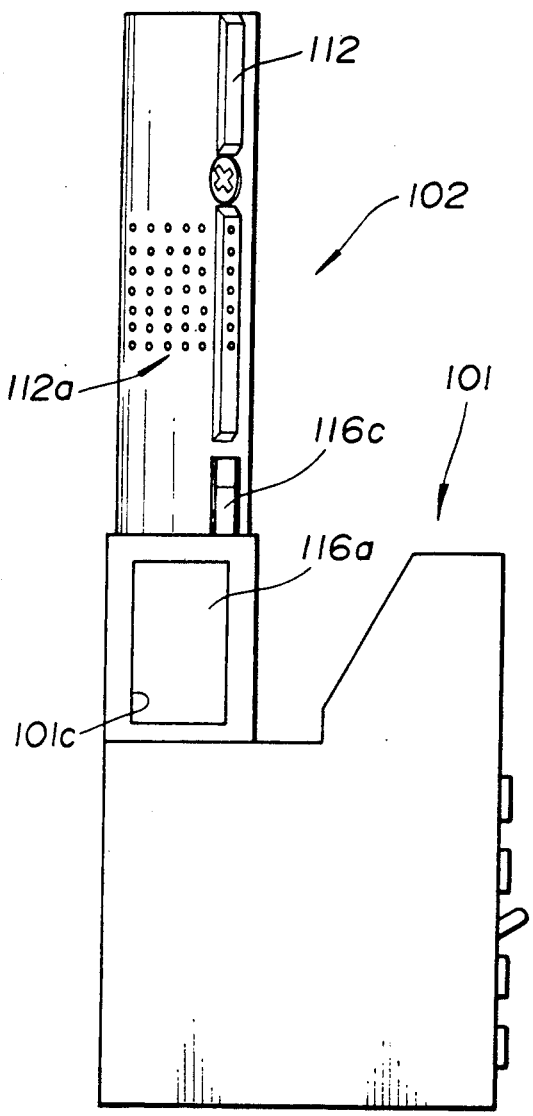
FIG.14  FIG.15

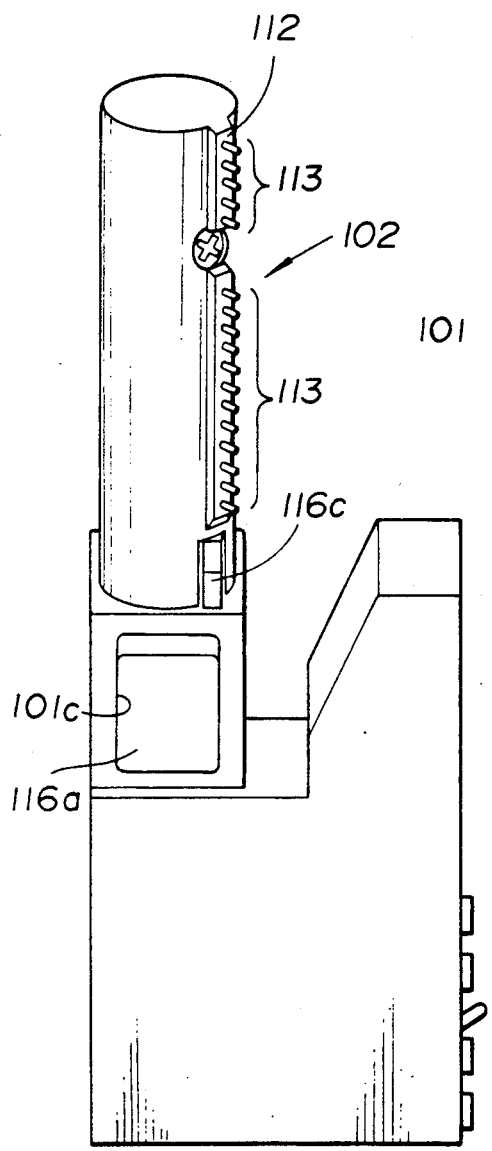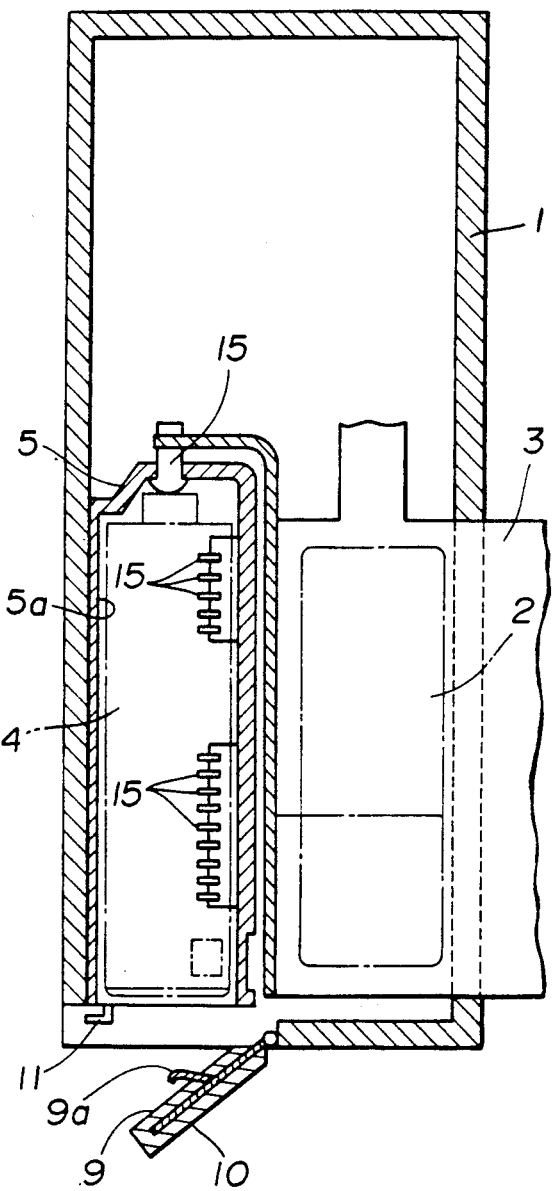
FIG. 18  FIG. 21

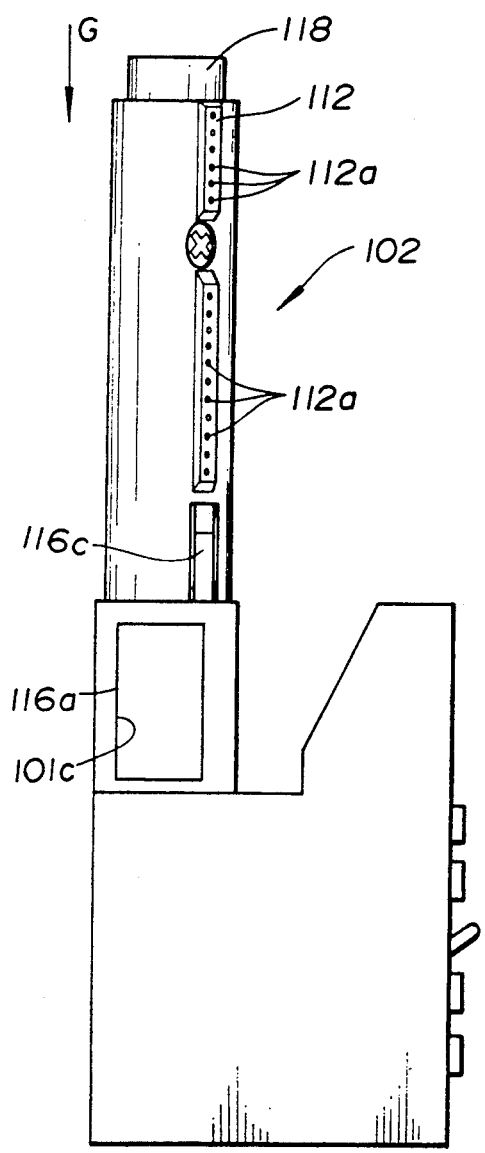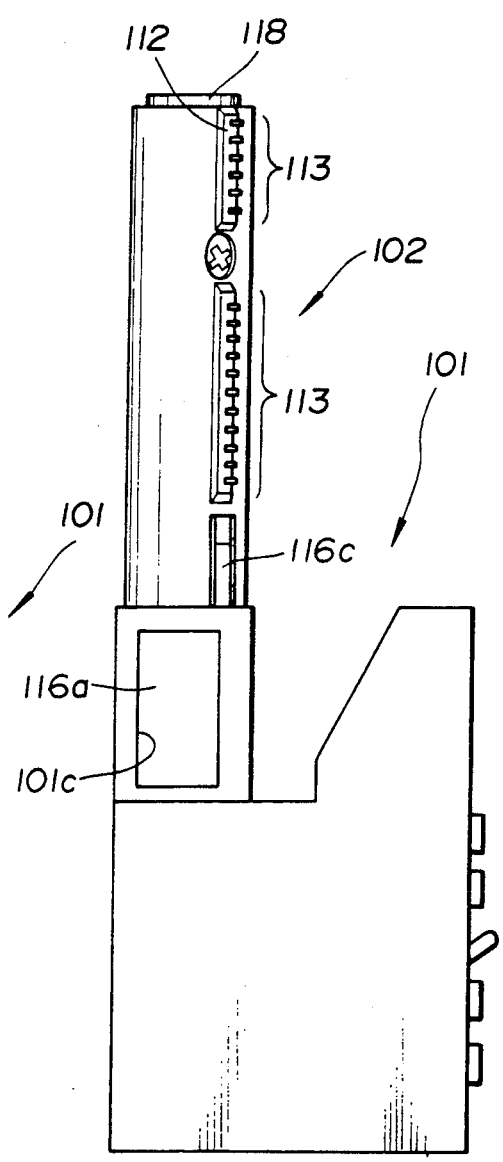
FIG.19  FIG.20

EQUIPMENT FOR CONNECTION TO ELECTRONIC EQUIPMENT

FIELD OF THE INVENTION

BACKGROUND OF THE INVENTION

This invention relates to an electronic equipment for connection, which is connected to an electronic equipment, such as a tape recorder or a variety of video equipment, and adapted for exchanging information signals with the electronic equipment.

The electronic equipment, constructed as the tape recorder, video tape recorder video camera or the television, is in widespread use.

In such electronic equipment, especially that designed for reducing its size for ease of transport there is proposed such an equipment in which a battery housing section is provided within the outer casing and a dry battery is accommodated in the battery housing section so as to be used as a power source.

There is also proposed an electronic equipment for connection which is connected to the above mentioned electronic equipment when in use and which is adapted for exchanging information signals with the electronic equipment connected thereto.

Among these electronic equipment for connection, there are, for example, a microphone device for converting the sound into electrical signals and supplying the signals to the electronic equipment, a speaker device for converting the electrical signals supplied from the electronic equipment, a video camera device for converting the image into electrical signals and supplying these electrical signals to the electronic equipment, a remote control device for generating control signals for controlling the operation of the electronic equipment, a display device for displaying a predetermined information on the basis of electrical signals supplied from the electronic equipment, a signal converter such as an A/D or D/A converter, a memory device, or a power source device for supplying a power source for operating the electronic equipment.

The electronic equipment to which the electronic equipment for connection is connected, referred to hereinafter as the connected electrical equipment, has a plurality of connection terminals adapted for exchanging information signals. These connection terminals are constructed as so-called connection jacks to which may be inserted connection plugs connected to the electronic equipment for connection or as connectors having a plurality of terminal pins. The connection terminals are mounted on the other casing so as to lie outwardly of an outer casing of the connected electronic equipment.

The connection terminals of the connected electronic equipment vary with the electronic equipment for connection to which the connected electronic equipment is connected by means of these connection terminals. Examples of these connection terminals include a terminal to which acoustic signals are entered, a terminal from which the acoustic signals are outputted, a terminal to which image signals are entered, a terminal from which the image signals are outputted, a terminal to which various control signals are entered, a terminal from which the control signals are outputted and a terminal to which the power from the power source is entered. There are also instances wherein there are provided connection terminals having different impedances for the electronic equipment for connection or terminals for right and left channels for input and output of stereophonic audio signals.

That is, with the above described connected electronic equipment, there are provided connection terminals in dependence upon the functions possessed by the equipment or the type of the electronic equipment for connection that may be connected to this electronic equipment.

Meanwhile, in an electronic equipment employing a magnetic tape cassette or an optical disk as a recording medium and constructed as a signal recording and/or reproducing apparatus, there is proposed such an equipment which, due to miniaturization of electronic components, in reduced in size to such an extent that the outer casing thereof is substantially of the same size as the recording medium employed. With such a small size electronic equipment, the size of the equipment may be reduced further by reducing the number of the connection terminals.

There is also proposed such electronic equipment which is endowed with a larger number of functions and which enables digital signals to be exchanged between it and the electronic equipment for connection. It is difficult with such electronic equipment to reduce the number of the connection terminals.

That is, in such electronic equipment, the very fact that the connecting terminal mounting section is provided on the outer casing raises difficulties in further reducing the size of the equipment in its entirety.

On the other hand, the very fact that a larger number of connection terminals are attached to the outer casing complicates tho assembling and fabrication of the electronic equipment.

In addition, since the connection terminals are exposed to the outside of the outer casing, the user's hand or finger is likely to touch these connection terminals so that it becomes difficult to protect the connection terminals from injury or corrosion.

OBJECT AND SUMMARY OF THE INVENTION

It is therefore an object of the present invention to provide an electronic equipment for connection by means of which the construction of a connected electronic equipment may be reduced in size and simplified in assembling and fabrication, and the connection terminal of the connected electronic equipment may be protected from injury or corrosion.

BRIEF DESCRIPTION OF THE DRAWINGS

FIG. 14 is a plan view showing an example of the electronic equipment for connection in which the terminal pins are arrayed in a direction normal to the inserting direction.

FIG. 15 is a plan view showing another example of the electronic equipment for connection in which the terminal pins are arranged in a two-dimensional array.

FIG. 18 is a perspective view showing the construction of a connected electronic equipment employing a plate-shaped battery and an electronic equipment for connection which is convected to the connected electronic equipment.

FIG. 18 is a perspective view showing an electronic equipment for connection in which the terminal pins are stationary.

FIG. 19 is a plan view showing an electronic equipment for connection in which a push button is provided for moving the terminal pins.

FIG. 20 is a plan view similar to FIG. 10 in which the push button has been pressed down.

FIG. 21 is a plan view showing another example of the connected electronic equipment, with a portion being broken away.

DETAILED DESCRIPTION OF PREFERRED EMBODIMENTS

Figure 1:
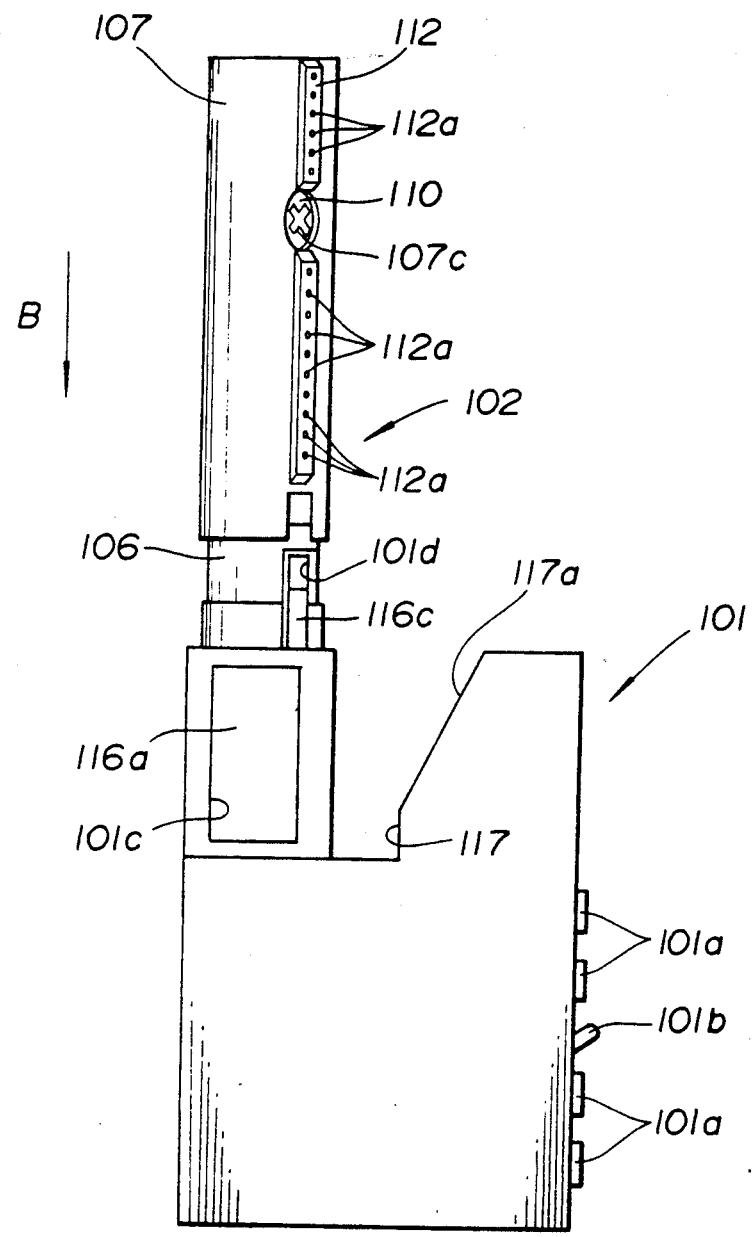
FIG. 1 is a plan view showing an electronic equipment for connection according to the present invention.
Figure 2:
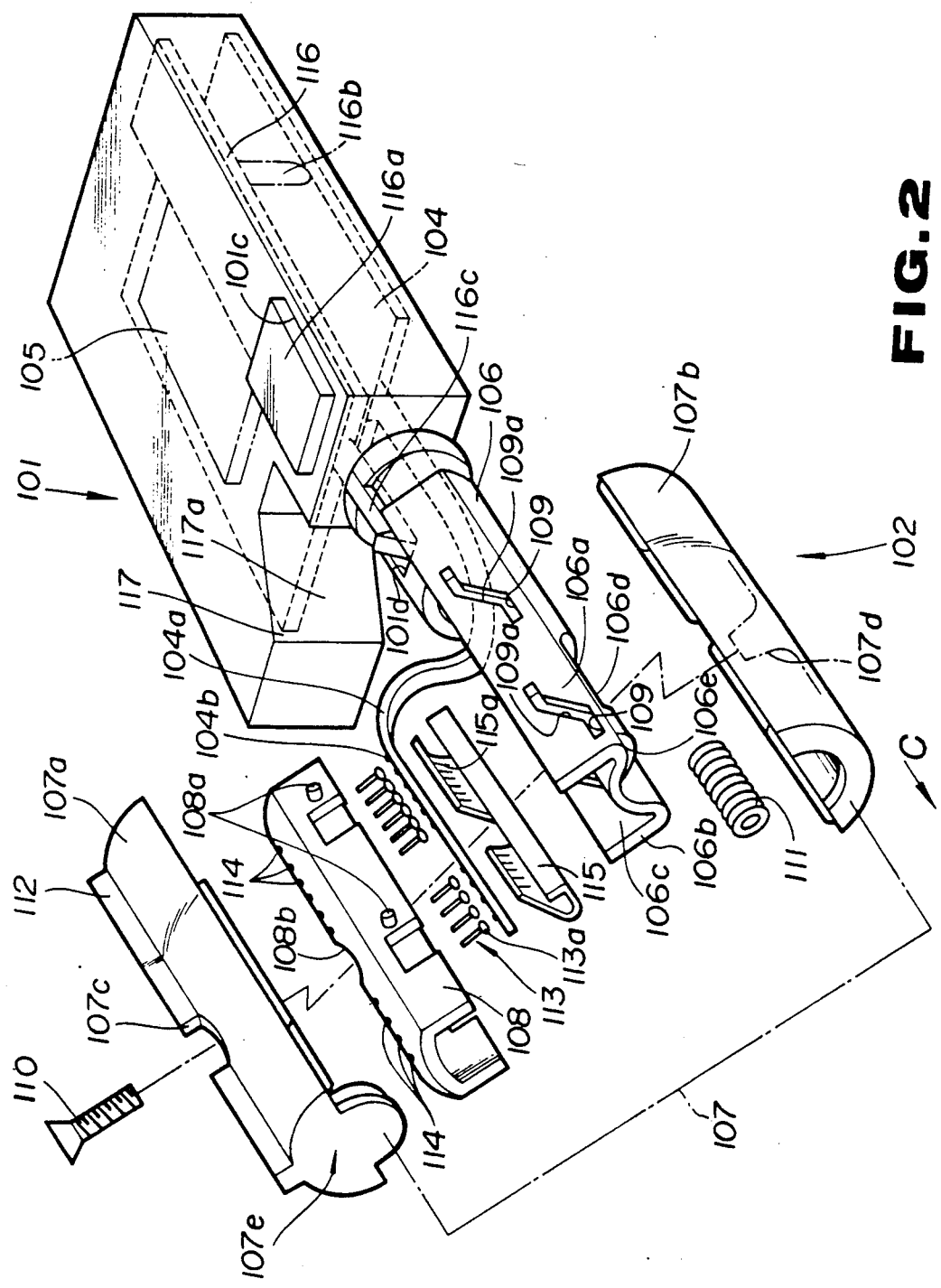
FIG. 2 is an exploded perspective view of the electronic equipment for connection shown in FIG. 1.

Referring to FIGS. 1 and 2, an electronic equipment for connection according to the present invention includes a main body section 101 and a cylindrical connecting section 102 mounted for projecting from the main body section 101. The connecting section 102 is of approximately the same size as the dry battery used as a power source of a connected electronic equipment which will be explained subsequently.

The main body section 101 is constituted by an outer casing of, for example, a synthetic resin, mounted on a circuit substrate 104 and accommodating therein a set of electronic components 105 making up an electronic circuit. The electronic circuit, made up of the set of the electronic components 105, functions as, for example, a microphone device for converting the sound into electrical signals and supplying the signals to the connected electronic equipment, a speaker device for converting the electrical signals supplied from the connected electronic equipment into sound, a video camera device for converting the image into electrical signals and supplying the signals to the connected electronic equipment, a remote control device for generating control signals for controlling the operation of the connected electronic equipment a display device for displaying the information, such as the operating state or signal level, on the basis of information signals supplied from the connected electronic equipment, a signal converter such as an A/D converter or a D/A converter, an extended memory device for supplementing a memory device in the connected electronic equipment, or as a power source device for supplying an operating power to the connected electronic equipment.

On the outer surface of the main body section 101, there are provided various connecting jacks 101a, connectors or switches 101b connected to the electronic circuit formed by the set of electronic components.

The connecting section 102 includes a shank 106 integral with and extending from the main body section 101, a slide tube 107 fitted over the shank leg and supported by the shank for sliding axially with respect thereto as shown by an arrow B in FIG. 1, and a terminal pin holder 108 mounted within the shank 106 for sliding movement along with the slide tube 107.

The shank 106 has a U-shaped cross-section, that is, it has an axially extending open space 106c on one side which is oriented at an angle of 45° relative to the plane of the main 108b of the shank 106 are each formed with a pair of slide guide cam slots 109, 109. These cam slots 109,109 on these side wall sections are in register with each other and are each formed with inclined sections 109a so that the cam slots approach to the outside of the open space 106c towards the distal end of the shank 106.

The slide tube 107 is formed by upper and lower semicylindrical shells 107a, 107b which are abutted and connected to each other by a set screw 110 and closed at one end. The upper shell 107a has a tapped hole 107c and the lower shell 107b is formed with a male threaded boss 107d.

The slide tube 107 is fitted on the outer side of the shank 106 with the shank 106 inserted into the open end of the tube 107. At this time, the male threaded boss 107d is passed through an elongated opening 106d in the shank 106, so that the slide tube 107 may be slid within the extent that the boss 107d is movable within the elongated opening 106d.

A compression coil spring 111 is installed between the inner side of an end wall section 107e of the slide tube 107 and a spring retention wall 106e of the shank 106. The coil spring 111 biases the slide tube 107 in a direction shown by an arrow C in FIG. 2, that is in a direction away from the main body section 101.

The slide tube 107 has substantially the same shape as the dry battery functioning as the power source of the connected electronic equipment. On the outer surface of the slide tube 107 is formed an axially extending positioning rib 112. The rib 112 is provided at an angle of 45° relative to the plane of the main body section 101.

A terminal pin holder 108 is formed of a synthetic resin or the like and comprised of an elongated member having substantially the U-shaped cross-section and a size that can be accommodated between the side wall sections 106a, 106b of the shank 106. The terminal pin holder 108 is accommodated between the side wall sections 106a, 108b of the shank 106 with the open sides of the holder 108 and the shank lying opposite to each other. The holder 108 is provided with a through-hole 108b into which is passed a set screw 110 interconnecting the upper and lower halves 107a, 107b. The lateral sides of the terminal pin holder 108 are each formed with a pair of slide guide pins 108a, 108a which are introduced through the slide guide cam slots 109, 109.

A plurality of terminal pin holder openings 114 are formed on a web section of the holder 108 along the axis of the shank 106 at a predetermined pitch. A plurality of terminal pins 113 constituting a plurality of connecting terminals are engaged in these openings 114. These terminal pins 113 are enlarged in diameter as stoppers 113a at the proximal ends. These stoppers 113a are disposed at the inner side of the holder 108 to prevent accidental extrication of the terminal pins 113 towards the outside of the terminal pin holder 108. Within the terminal pin holder 108 is mounted a spring plate 115 for biasing the terminal pins 113 towards the outside of the terminal pin holder 108. This spring plate 115 is bent so that it can be accommodated within the terminal pin holder 108. The spring plate 115 has a comb-shaped thrusting section 115a associated with the terminal pins 113 for independently thrusting and supporting the terminal pins 113. That is, the terminal pins 113 may be thrust and biased outwardly of the terminal pin holder 108 without regard to the movement of the adjoining terminal pins 113.

Figure 3:
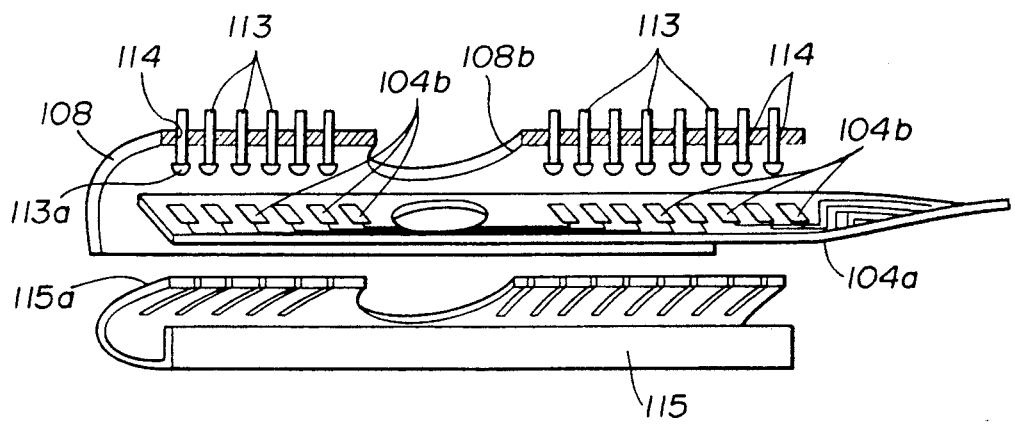
FIG. 3 is an enlarged exploded perspective view showing essential parts of the connecting portion of the electronic equipment for connection shown in FIG. 1.

Referring to FIG. 3, the terminal portion of a flexible substrate section 104a extended from the circuit substrate 104 is interposed between the terminal pins 113 and the spring plate 115. A plurality of terminal patterns 104b are formed on the substrate section 104a in register with the terminal pins 113 for abutting on the proximal ends of the terminal pins 113. These terminal patterns 104b are connected to a predetermined portion of the electronic circuit constituted by the set of electronic components 105. These terminal patterns 104b and the associated terminal pins 113 constitute for example a connection terminal to which sound signals are entered, a connection terminal from which the sound signals are outputted, a connection terminal to which image signals are entered, a connection terminal from which the image signals are outputted, a connection terminal to which various control signals are entered, a connection terminal from which the control signals are outputted, a connection terminal for detecting that connection to the connected electronic equipment has been made, or a connection terminal from which an output is issued from the power source.

Figure 6:
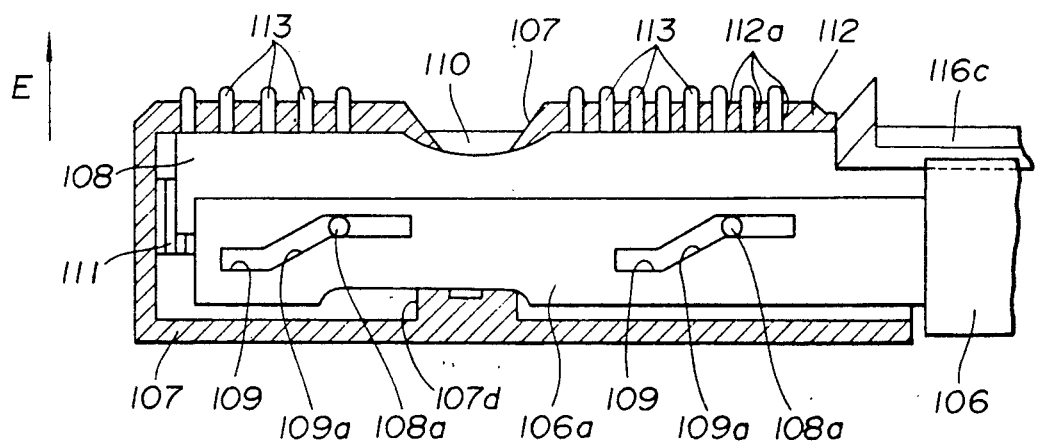
FIG. 6 is an enlarged cross-sectional view showing the state in which the connecting operation of the connecting portion of the electronic equipment for connection has been terminated.
Figure 4:
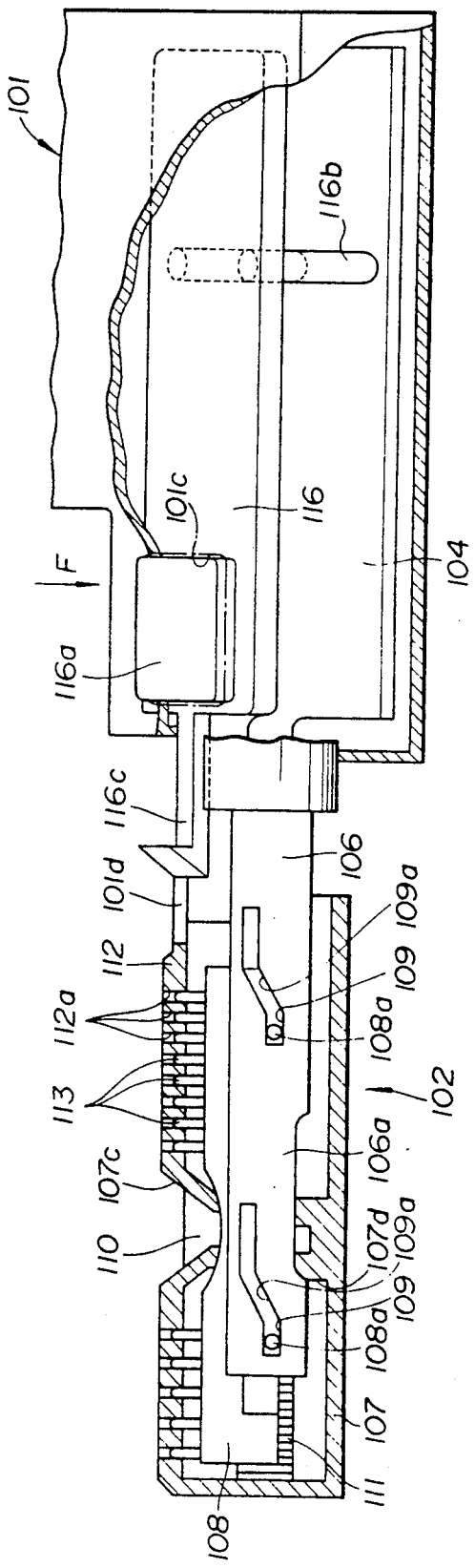
FIG. 4 is an enlarged cross-sectional view of the electronic equipment shown in FIG. 1.
Figure 5:
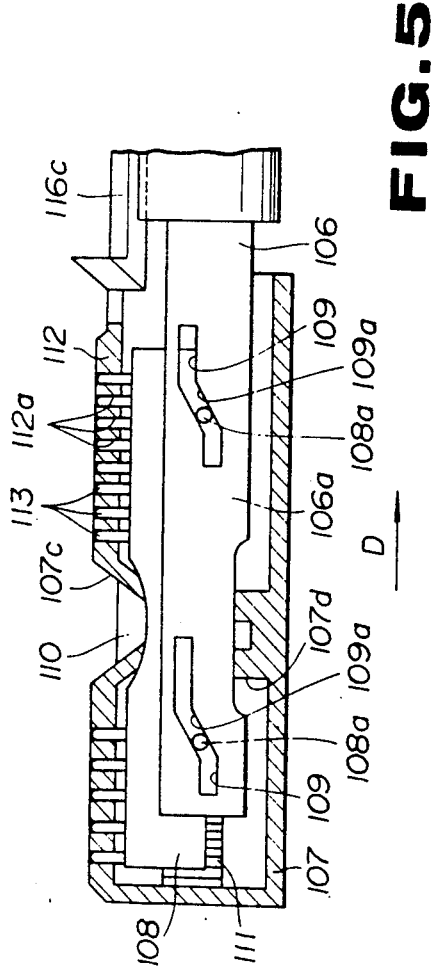
FIG. 5 is an enlarged cross-sectional view of the connecting portion of the electronic equipment for connection, shown in the process of connection.

Referring to FIG. 4, the distal ends of the terminal pins 113 are introduced into a plurality of terminal openings 112a provided in the rib 112 of the slide tube 107 in register with terminal pin holder openings 114. When the slide tube 107 is positioned towards the distal end of the shank 108, the distal ends of these terminal pins 113 are immerged in the terminal openings 112a. Referring to FIG. 5, when the slide tube 107 is moved towards the distal end of the shank 106, as shown by an arrow D in FIG. 5, against the bias of the compression coil spring 111, the terminal pin holder 108 is moved along with the slide tube 107 by means of the terminal pin 113 and the set screw 110. The slide guide pins 108a are moved within the slide guide cam slots 109 and moved by the inclined portions 109a towards the open space 106c. The terminal pin holder 108 is moved in a direction to approach to the positioning rib 112, so that, as shown in FIG. 6, the distal ends of the terminal pins 113 are protruded outwards by way of the terminal openings 112a, as shown by an arrow E in FIG. B.

Within the main body section 101, a plate-shaped latch lever 116 formed of a resilient synthetic resin or the like is arranged along the inner wall of the main body section, as shown in FIG. 4. This latch lever 116 is mounted for extending towards the proximal end of the shank 106 and has an end surface towards the shank 106 as a push button 110a which is exposed to outside via a through-hole 101c formed in the main body section 101. The latch lever 116 is formed with a pair of legs 110b on the surface opposite to the push button 116a. These legs 116b abut on the circuit substrate 104 within the main body section 101 for positioning the latch lever 116. This latch lever 118 is formed with a hook-shaped latch section 116c at the more distal side than the push button 110a. The distal end of the latch section 116c is protruded outwards by way of a through-hole 101d formed in the distal end of the shank 106.

When the push button 110a is thrust as shown by an arrow F in FIG. 4, the latch lever 116 is resiliently deformed with the legs 116b acting as the fulcrum and with the proximal side abutting on the inner wall section of an outer casing 103, so that the latch section 116c is intruded into the through-hole 103b.

A cover member housing section 117 is provided in the main body section 101 and is provided at a position which is in register with the opened cover member 10 of the connected electronic equipment when the electronic equipment for connection is connected to the connected electronic equipment. The portion of the housing section 117 abutted by the distal end of the opened cover member 10 when the electronic equipment for connection is connected to the connected electronic equipment is formed as an inclined section 117a. As the consequence of the connection of the electronic equipment for connection to the connected electronic equipment, the housing section 117 guides the cover member 10 towards the shank 106 to control the partial rotation of the cover member 10 on completion of the connection of the electronic equipment for connection to the connected electronic equipment.

Figure 7:
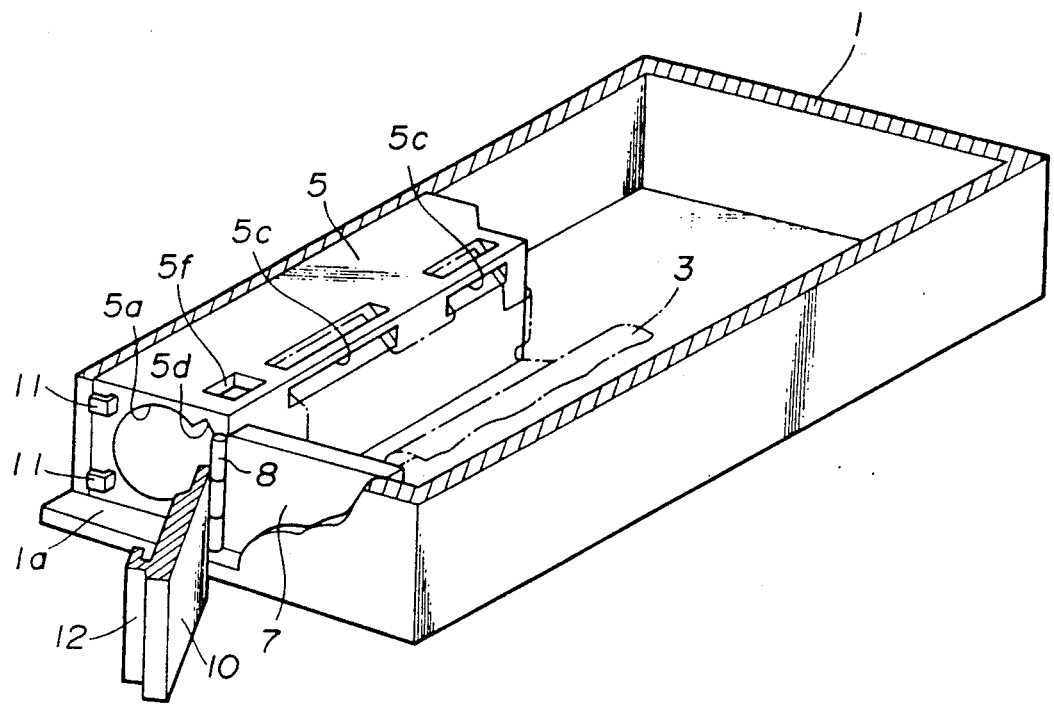
FIG. 7 is a perspective view showing an electronic equipment for connection connected to the connected electronic equipment, with a portion being broken away.
Figure 8:
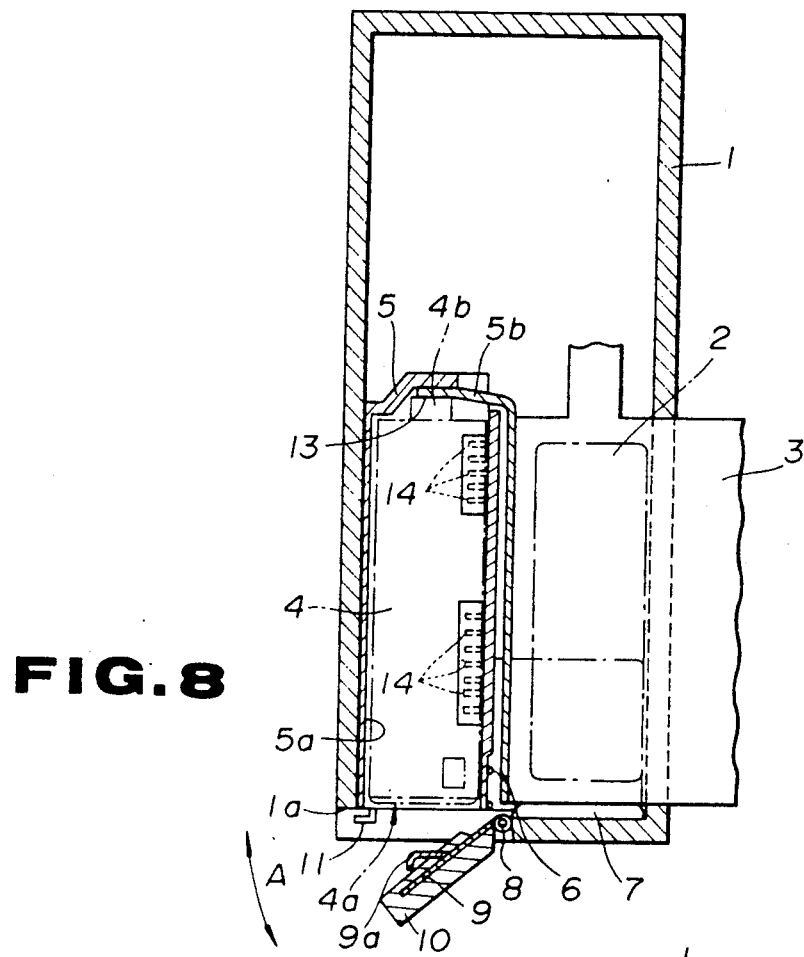
FIG. 8 is a plan view showing the connected electronic equipment, with a portion being broken away.

Referring to FIGS. 7 and 8, the connected electronic equipment includes an outer casing 1 formed of synthetic resin or metal and a set of electronic components 2 making up an electronic circuit is housed within the outer casing 1.

The set of the electronic components 2 is attached, such as by soldering, to the circuit substrate 3 placed within the outer casing 1, for constituting the above mentioned electronic circuit. The circuit substrate is formed by a flexible substrate comprised of a resilient film base plate on which are formed circuit patterns constituting the electronic circuit. The circuit base plate or substrate 3 is flexed along the inner wall of the outer casing 1 and accommodated in this state within the outer casing 1.

Within the outer casing 1, there are also provided various units, not shown depending on the function of the connected electronic equipment. When the connected electronic equipment is a tape recorder, these units may include a unit for holding and rotating a tape reel of a tape cassette, a data signal read/write unit provided with a magnetic head or the like, and a display unit provided with a liquid crystal display. When the connected electronic equipment is a disk player, these units may include a unit for holding and rotating a disk, a data signal read/write unit provided with an optical pickup and a display unit provided with a liquid crystal display.

Towards one lateral side of the outer casing 1, there is provided a battery housing member 5 formed of synthetic resin or the like for holding a dry battery 4. The dry battery 4 is in the form of a column and may for example be a manganese dry cell or alkali-manganese dry cell provided with a negative electrode 4a and a positive electrode 4b at both end surfaces thereof as shown in FIG. 8.

The housing member 5 is prismatic and formed integrally of a synthetic resin or the like material. The housing section 5 has a holding section 5a for accommodating and holding the dry battery 4. The holding section 5a is formed by a cylindrical hollow portion mating with the dry battery 4. The sides of the holding section 5a associated with the negative electrode 4a and the positive electrode 4b of the dry battery 4 remain opened and closed, respectively.

A battery inserting opening 1a is formed on the bottom surface of the outer casing 1 so that the negative electrode 4a of the dry battery 4 housed in the housing member 5 faces to the outside of the outer casing 1. This battery inserting opening 1a is formed to permit the dry battery 4 to be inserted from outside into the housing member 5.

A circuit substrate supporting plate 7 is mounted by a set screw b on the lateral surface of the housing member 5 facing the inner side of the outer casing 1. The supporting plate 7 is formed of an electrically conductive material, such as metal, and is bent in the form of a letter L from the rear side towards the bottom surface of the outer casing 1. The supporting plate 7 is electrically connected to a grounding terminal of the electronic circuit formed by the set of the electronic components 2, and supports the circuit substrate 3.

A negative terminal plate 9, formed of the electrically conductive material, such as metal, is mounted by a supporting shaft 8 for rotation in a direction shown by an arrow A in FIG. 8 to a portion of the supporting plate 7 in register with the bottom surface of the outer casing 1 and the battery inserting opening 1a. When rotated towards the side of closing the battery inserting opening 1a the negative terminal plate 9 abuts on the negative electrode 4a of the dry battery 4. A contractor 9a in the form of a spring plate is formed integrally with the negative terminal plate 9 at a portion abutting on the negative electrode 4a to provide for positive electrical connection with the negative electrode 4a.

The cover member 10 of synthetic resin or the like material is mounted on the negative terminal plate 9 to cover the side of the negative terminal plate 9 facing the outer surface of the outer casing 1. That is, the battery inserting opening 1a may be opened or closed by the cover member 10. The cover member 10 is also provided with an engaging portion 12 for engaging with an engaging pawl 11 provided in the vicinity of an inlet of the holding section 5a of the housing member 5 on closure of the cover member 10 to prevent the exposure of the battery inserting opening 1a.

Figure 10:
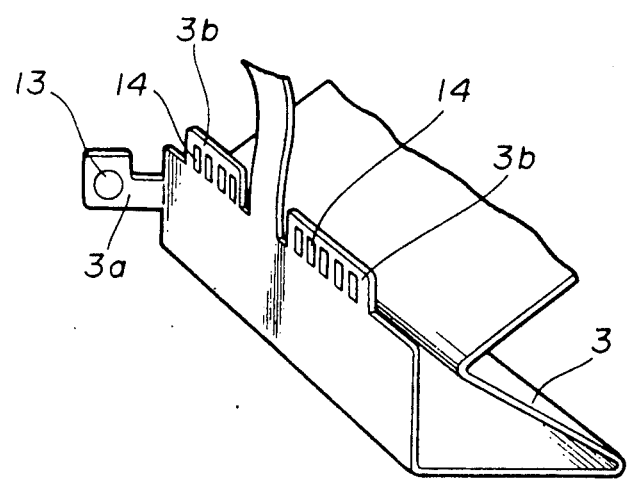
FIG. 10 is a perspective view showing the profile of a circuit substrate of the connected electronic equipment.
Figure 9:
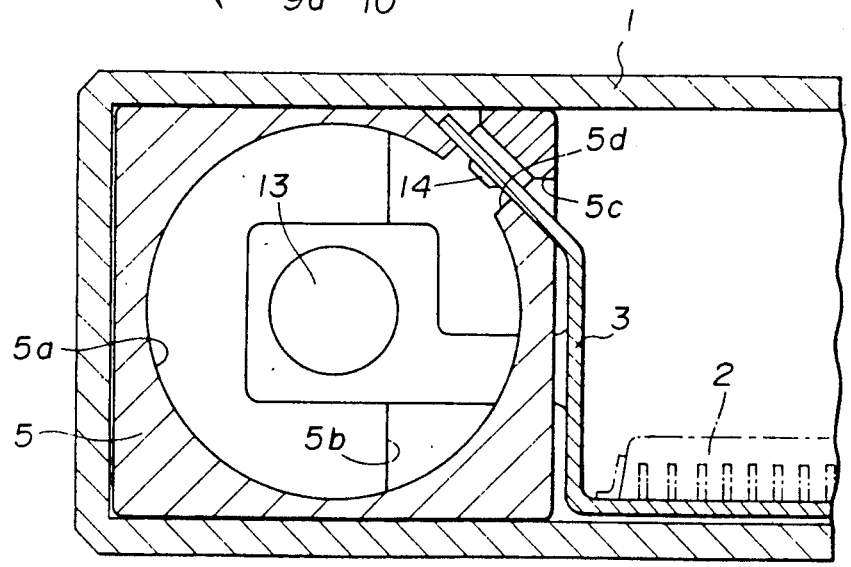
FIG. 9 is an enlarged longitudinal sectional view showing a battery housing member constituting the connected electronic instrument.
Figure 11:
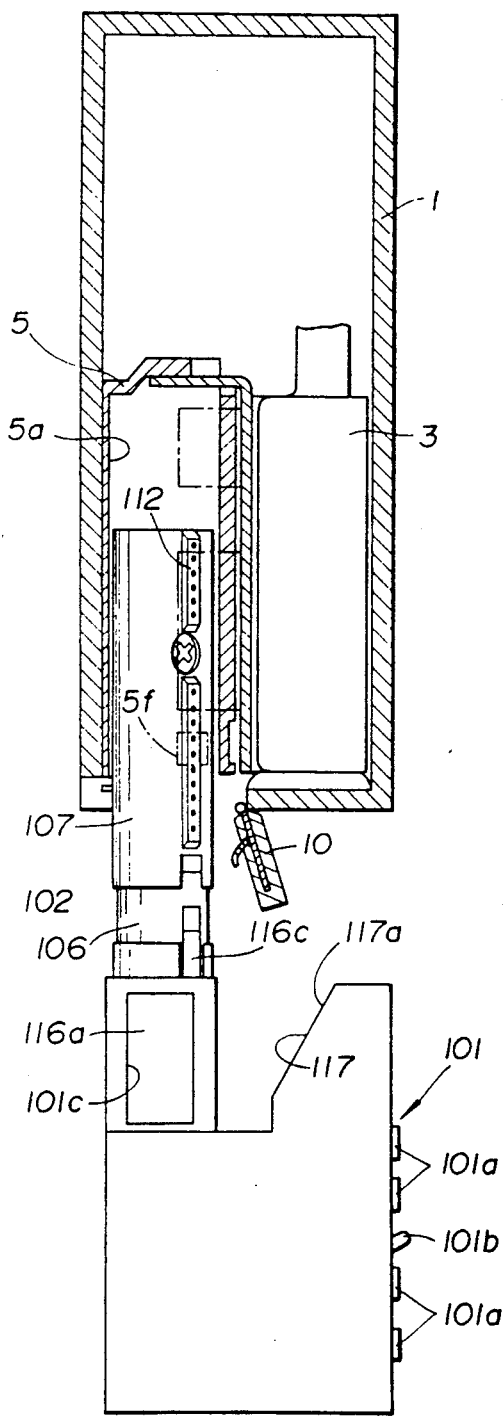
FIG. 11 is a plan view showing the state of starting of the connecting operation of the electronic equipment for connection to the connected electronic equipment, with a portion being broken away.
Figure 12:
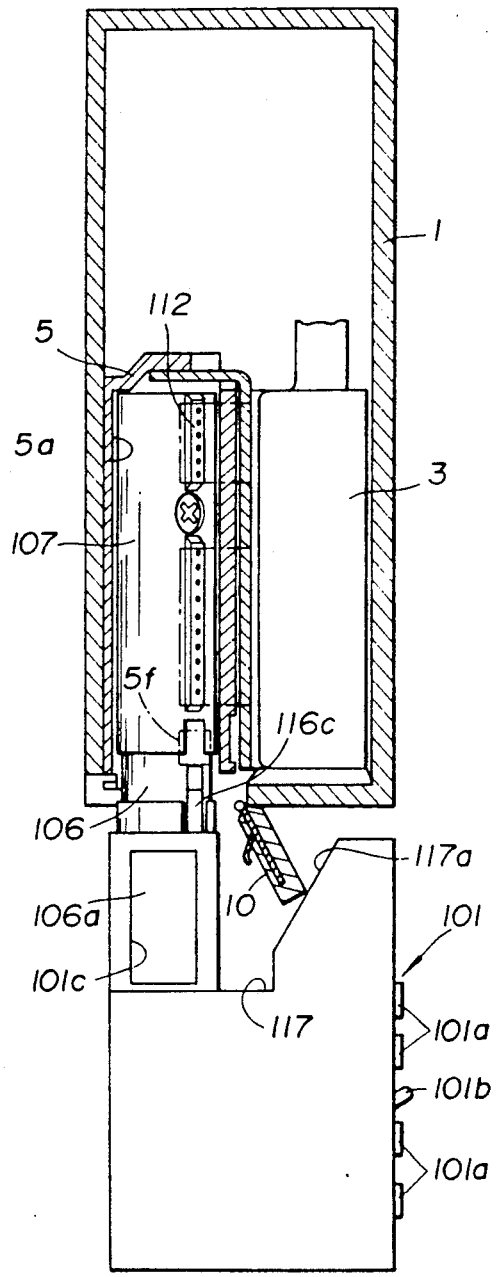
FIG. 12 is a plan view similar to FIG. 11 showing the intermediate state of the connecting operation.

Referring to FIG. 9, a positive terminal pattern section 3a of the circuit substrate 3 is inserted into the inside portion of the holding section 5a facing the positive terminal 4b by way of a slit 5b formed in the housing section 5. The pattern section 3a is a part of the circuit substrate 3 and bent along the housing member 5 so as to be inserted into the slit 5b as shown in FIG. 10. The positive terminal pattern section 3a has a positive terminal pattern 13 for abutment by the positive electrode 4b. The positive terminal pattern 13 is connected to a power source supply terminal of the electronic circuit. That is, when the dry battery 4 is inserted into the housing member 5 via opening 1a and the opening 1a is then closed by the cover member 10, the power from the power source is supplied to the electronic circuit 4 by the dry battery 4.

A connection terminal pattern section 3b forming a portion of the circuit substrate 3 and provided with a plurality of connecting terminal patterns 14 for connection to the terminal pins 113 of the electronic equipment for connection is introduced into the housing member 5 by way of a second slit 5c in the housing member 5 as shown in FIG. 9. The connection terminal patterns 14 are arrayed with the same pitch as the terminal pins 113 of the connecting electronic equipment. The second slit 5c is formed for passing through a thickened corner of the housing member 5 along the longitudinal direction of the housing member 5. Within the holding section 5a, a terminal pattern arraying recess 5d is formed along the second slit 5c for establishing communication between the inside of the slit 5c and the inner space of the holding section 5a. The arraying recess 5d is provided at an angle of 45° relative to the plane of the outer casing 1, with the axis of the holding section 5a as the reference, so as to be in register with the positioning rib 112 of the connecting electronic equipment.

The connecting terminal patterns 14 on the connecting terminal pattern section 3b are arrayed within the arraying recess 5d and adapted for facing the inside space of the holding section 5a by way of the arraying recess 5d. Thus the pattern section 3b introduced into the housing member 5 does not obstruct the insertion of the dry battery 4 into the holding section 5a.

The connecting terminal patterns 14 are connected to predetermined portions of the electronic circuit so as to be used as for example, a terminal to which acoustic signals are entered, a terminal from which the acoustic signals are outputted, a terminal to which video signals are entered, a terminal from which the video signals are outputted a terminal to which various control signals are entered, a terminal from which the control signals are outputted, a terminal for detecting that the connecting electronic equipment has been connected, for a terminal supplied with the power from the power source.

A latch engaging opening 5f for preventing accidental extrication of the electronic equipment for connection on connection of the electronic equipment for connection is provided in the vicinity of an inlet to the holding section 5a of the housing member 5.

For connecting the electronic equipment for connection according to the present invention to the above described connected electronic equipment the cover member 10 is first opened for exposing the holding section 6a to outside. If at this time the dry battery 4 is accommodated in the holding section 5a, the battery 4 is taken out. The positioning rib 112 is then fitted into the arraying recess 5d for setting the axial rotational position of the connecting section 102. The connecting section 102 is then inserted into the holding section 5a. Since the axial rotational positioning of the connecting section has now been established by the rib 112 and the arraying recess 5d, the plane of the main body section 101 of the electronic equipment for connection is flush with the plane of the outer casing 1 of the connected electronic equipment. At this time the cover member 10 is inserted into the cover member housing section 117.

When the distal end of the slide tube 107 abuts on the positive terminal pattern 13 within the housing section 5c, the slide tube 107 positions the foremost part of each terminal pin 113 in opposition to the associated connecting terminal pattern 14. At this time, the slide tube 107 is not moved relative to the shank 106.

When the outer casing 103 of the electronic equipment for connection is moved in a direction towards the outer casing 1 of the connected electronic equipment the compression coil spring 111 is compressed to shift the shank 106 relative to the slide tube 107. The terminal pin holder 108 is now moved for protruding the distal ends of the terminal pins 113 outwards by way of the terminal openings 112a, so that the distal ends of these terminal pins 113 are brought into contact with the associated connecting terminal patterns 14. These terminal pins 113 are connected to the connecting terminal patterns 14 at a substantially upstanding and neighboring position. At this time, the latch section 116c abuts on the inlet of the holding section 5a for resiliently deforming the latch lever 110 into the through hole 103b. The cover member 10 has its distal end abutting on tho inclined portion 117a of the cover member housing section 117, and is guided towards the shank 106 as a result of the insertion into the holding section 5a of the connecting section 102, by way of limiting the rotation of the cover member 10.

Figure 13:
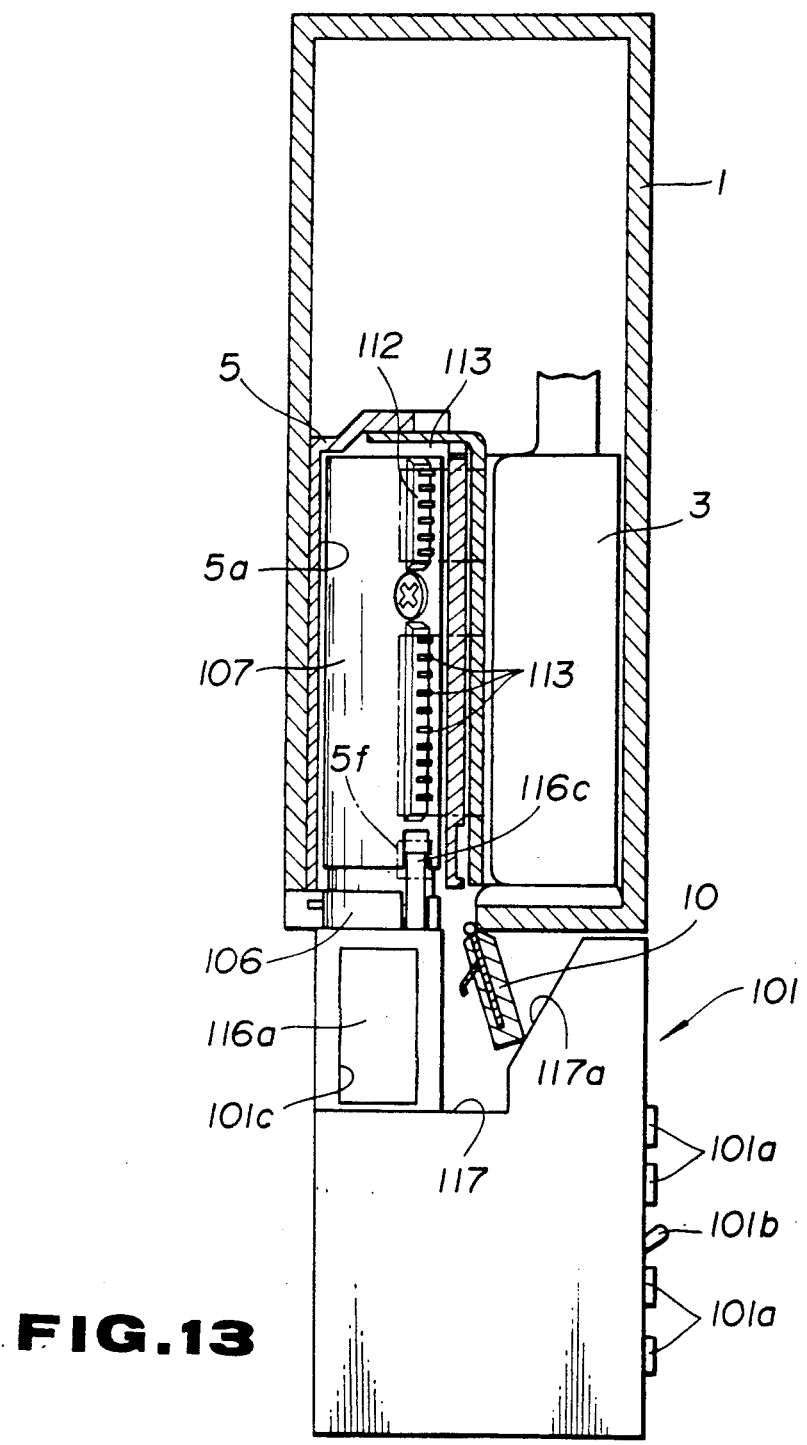
FIG. 13 is a plan view similar to FIGS. 11 and 12 showing the state of completion of the connecting operation.

When the shank 106 has been moved to a predetermined position, the distal end of the latch 110c faces the latch engaging opening 5f of the battery housing member 5, as shown in FIG. 13, and is engaged in the opening 5f under the resiliency of the latch lever 110. With the foremost part of the latch 116c thus inserted into the latch engaging opening 5f, the electronic equipment for connection may be prevented from being extricated from the connected electronic equipment.

With the terminal pins 113 thus connected to the connecting terminal pattern 14, the electronic equipment for connection according to the present invention is connected to the mating connecting electronic equipment.

It is noted that, although the connecting terminal patterns 14 and the terminal patterns 113 are arrayed along the direction of insertion of the connecting section 102 into the holding section 5a, these terminal pins 113 may also be arrayed in a direction at right angles to the direction of inserting the connecting section 102 into the holding section 5a. In this case, the connecting terminal patterns 14 are arrayed in register with the terminal pins 113.

The terminal pins 113 may also be arrayed two-dimensionally, that is, in a matrix, as shown in FIG. 15. In this case, the connecting terminal patterns 14 are arrayed so as to be in register with the terminal pins 113.

The present invention is not limited to the case in which the electronic equipment for connection is connected to the connected electronic equipment which is cylindrical in shape and which makes use of the dry battery 4 as the power source. That is, the electronic equipment for connection according to the present invention may also be connected to the connected electronic equipment which is rectangular in shape and which makes use of a rectangular battery 16 as the power source.

Figure 16:
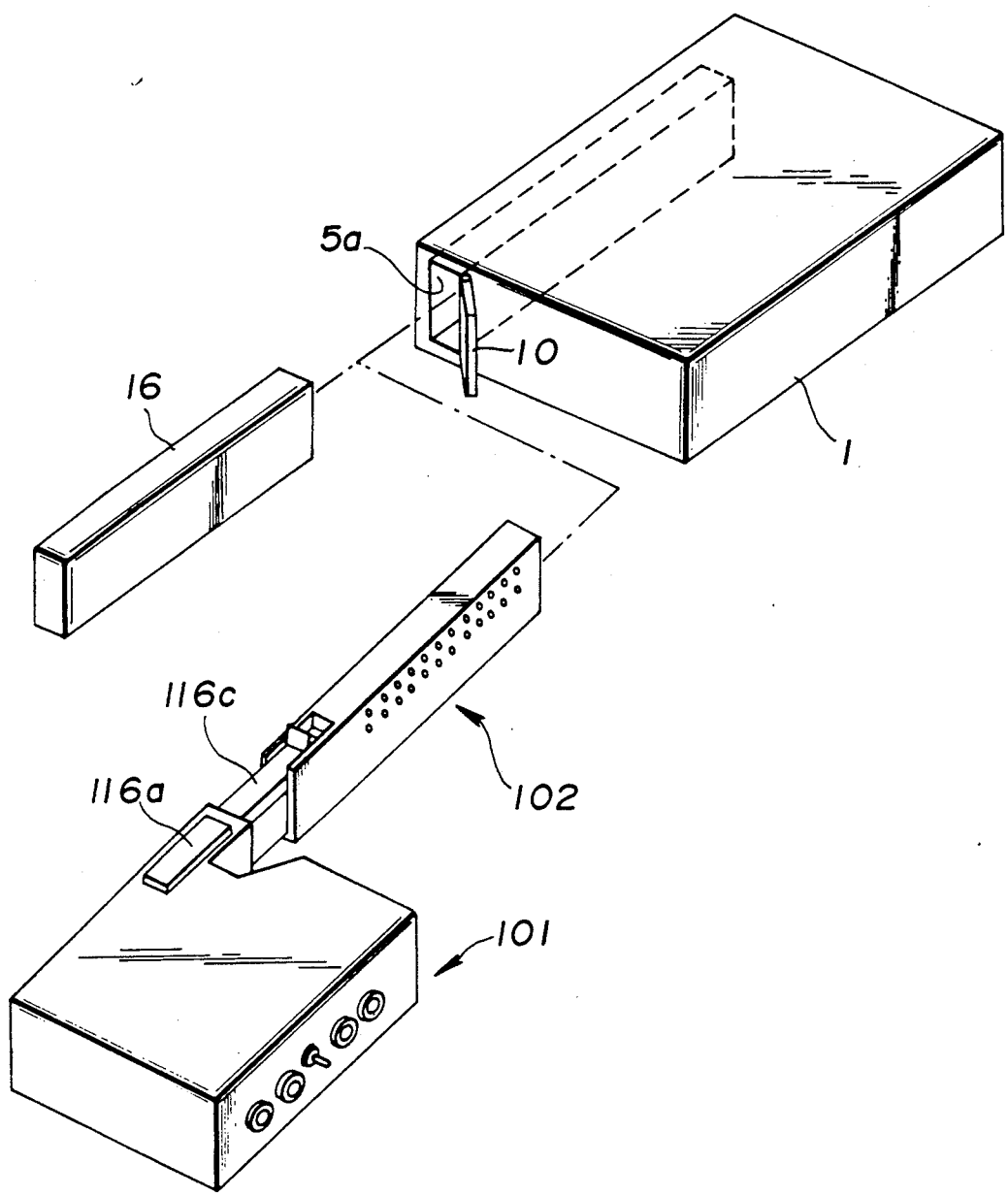

With the connected electronic equipment, making use of the rectangular battery 16 as the power source, the holding section 5a of the housing member 5 is in the form of a rectangular slit in register with the rectangular battery 16, as shown in FIG. 16. With such connected electronic equipment, the connecting terminal patterns 14 face the inside of the holding section 5a.

The electronic equipment for connection, connected to the connected electronic equipment, is provided with the main body section 101 and the connecting section 102 which is of substantially the same shape as the rectangular battery 16. When the connecting section 102 is inserted into the holding section 5a, the terminal pins 113, enclosed within the connecting section 102, are protruded outwards as a result of the relative sliding movement between the shank 106 as the connecting section 102 and the slide tube 107 having the rectangular cross-section, with the distal ends of the terminal pins 113 abutting on the associated connecting terminal patterns 14.

Figure 17:
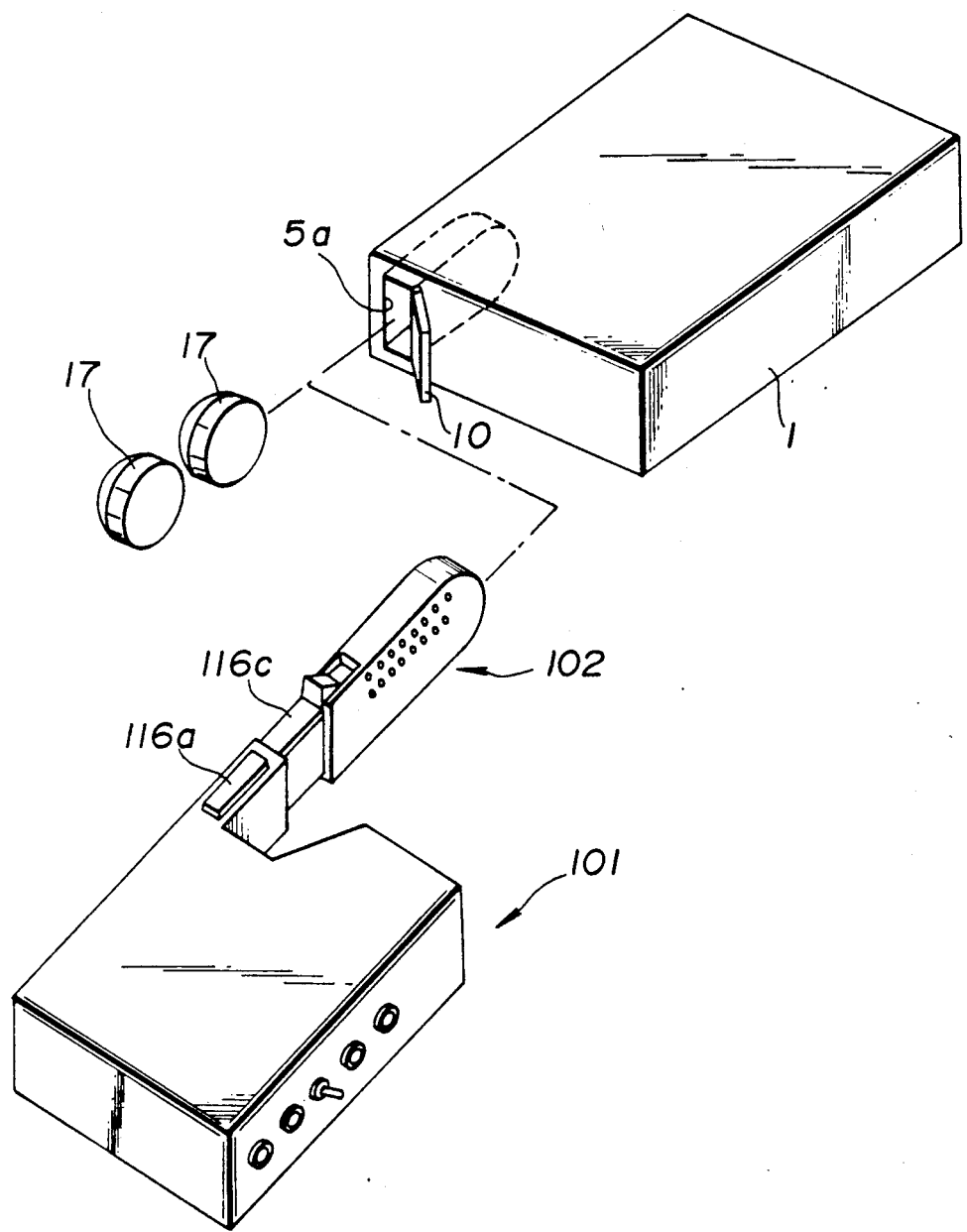
FIG. 17 is a perspective view showing the construction of a connected electronic equipment employing a button battery and an electronic equipment for connection connected to the connected electronic equipment.

The electronic equipment for connection according to the present invention may also be connected to a connected equipment making use of a button-shaped button battery 17 as the power source as shown in FIG. 17.

With the connected electronic equipment making use of the button battery 17 as tho power source, the holding section 5a of the battery housing member 5 is formed as a slit having the same shape as the button battery 17. With this connected electronic equipment, the connecting terminal pattern 14 faces the inside of the holding section 5a.

The electronic equipment for connection, connected to this connected electronic equipment, includes a main body section 101 and a connecting section 102 having substantially the same shape as the button battery 17. When the connecting section 102 is inserted into the holding section 5a, the terminal pins 113 enclosed within the connecting section 102 are protruded outside as a result of the relative sliding movement between the shank 106 as the connecting section 102 and the slide tube 107 having the rectangular cross-section so that the foremost parts of the these terminal pins 113 abut on the associated connecting terminal patterns 14.

The present invention is also not limited to the electronic equipment for connection in which the terminal pins 113 are protruded upon completion of the insertion of the connecting section 102 into the holding section 5a, as in the above described embodiment. Thus the terminal pins 113 may be permanently supported in the state in which they are protruded towards the other periphery of the connecting section 102, as shown in FIG. 1B. In this case, the connecting section 102 may be formed integrally with the outer casing 103 of the main body section 101.

In this case, there is the risk that, on inserting the connecting section 102 into the holding section 5a, the terminal pins 113 be contacted with the unassociated terminal patterns 14 or be slid in the inserting direction of the connecting section 102 with respect to these connecting terminal patterns 14. In such case, in the circuitry of the above described connected electronic equipment and/or electronic equipment for connection, measures need to be taken against shorting so that the circuitry may not be destroyed as a result of the mistaken connection between the connecting terminal patterns 14 and the terminal pins 113. When the connecting terminal patterns 14 and the terminal pins 113 are arayed in a direction at right angles to the inserting direction of the connecting section 102 relative to the holding section 5a, such measures need not be taken because the terminal pins 113 are unlikely to be contacted with the unassociated connecting terminal patterns 14 even if the terminal pins 113 are fixedly mounted on the connecting section 102.

The electronic equipment for connection according to the present invention may also be so constructed that, as shown in FIG. 19, the connecting section 102 is formed integrally with the outer casing 103 of the main body section 101 and a pushbutton 110 for protruding the terminal pins outwards is provided at the distal end of the connecting section 102. With such electronic equipment for connection, when the pushbutton 118 is pushed towards the main body section 101, as shown by an arrow G in FIG. 19, the terminal pins 113 enclosed within the connecting section 102 are protruded outwards as shown in FIG. 20.

In such case when the connecting section 102 is inserted into the holding section 5a, and the terminal pins 113 are protruded, there is a risk that these terminal pins 113 be slidingly contacted with the connecting terminal patterns 14 in the inserting direction of the connecting section 102. Therefore, when the connecting terminal patterns 14 and the terminal pins 113 are arrayed in the inserting direction of the connecting section 102 into the holding section 5a, the pitch between these terminal pins 113 and the connecting terminal patterns 14 should be such that the connecting terminal patterns 14 are not erroneously connected with the terminal pins 113. In such case, if the connecting terminal pins 14 and the terminal pins 113 are arrayed in a direction at sight angles to the inserting direction of the connecting section 102 into the holding section 5a, the risk of the terminal pins 113 being brought into contact with the unassociated connection terminal pattern is eliminated, so that the pitch between the terminal pins 113 and the connecting terminal patterns may be selected to a smaller value.

The present invention is not limited to the case in which the connected electronic equipment connected to the electronic equipment for connection according to the present invention includes plural connecting terminal patterns 14 formed on the circuit substrate 3. Thus the connected electronic equipment may be so constructed that as shown in FIG. 21, a plurality of terminal members 15 formed of metal or the like electrically conductive material is mounted by for example, insert molding, on the battery housing member 5 molded from synthetic resin, and the terminal pins 113 are connected to these terminal members.

What is claimed is:

1. An adapter device comprising
a tubular connecting section inserted into a battery housing section within an electronic equipment.
a main body section containing an electronic circuit and having a power supply section for supplying the power to said electronic equipment, and
a plurality of connecting terminals provided in said connecting section, said connecting terminals being electrically connectable to said electronic circuit and capable of abutting on a plurality of mating connecting terminal patterns in said battery housing section, said patterns being arrayed at right angles to the inserting direction of said connecting section,
data signals being exchanged between said electronic equipment and the electronic circuit of said main body section through at least one of said connecting terminals.

2. The adapted device according to claim 1 wherein said connecting section is substantially of the same shape as the battery contained in said battery housing section.

3. The adapter according to claim 1 comprising an elastic locking piece formed as one with said main body section, said locking piece engaging will a locked part provided in the main body of the electronic equipment for holding and locking said connecting section in the state in which it is inserted into said battery housing section.

4. The adapter device according to claim 1 wherein the electronic circuit of said main body section is a microphone device for converting the sound into electrical signals and supplying said electrical signals to said electronic equipment.

5. The adapter device according to claim 1 wherein the electronic circuit of said main body section is a speaker device for converting electrical signals from said electronic equipment into the sound.

6. The adapter device according to claim 1 wherein the electronic circuit is a video camera device for converting an image into electrical signals and supplying said electrical signals to said equipment.

7. The adapter device according to claim 1 wherein the electronic circuit is a remote controller for supplying control signals controlling the operation of said electronic equipment to said electronic equipment.

8. The adapter device according to claim 1 wherein the electronic circuit of said main body section is a display device for displaying the operating state or the signal level of said electronic equipment.

9. The adapter device according to claim 1 wherein the electronic circuit in said main body section is a signal converting device including an A/D converter and/or a D/A converter.

10. The adapter device according to claim 1 wherein said electronic circuit in said main body section is an extended memory device for compensating capacitance shortages in the memory device provided in said electronic equipment.

11. The adapter device according to claim 1 comprising a jack or plug for enabling an electrical connection between said electronic circuit and an external electronic circuit.

12. The adapter device according to claim 1 wherein said connecting section comprises
a shank supporting a plurality of connecting terminals electrically connected to said electronic circuit.
a slide tube covering said connecting terminals and said shank, said slide tube being slidable relative to said shank and having a plurality of through-holes through which pass at least said connecting terminals, and
projecting means for projecting said connecting terminal in an outward direction normal to the inserting direction of said connecting section through said through-holes by the sliding of said slide tube relative to said shank,
said projection means causing said connecting terminal to be moved outwardly in a direction normal to the inserting direction of said connecting section only when said connecting section is inserted into the battery housing section and said slide tube is moved relative to said shank, said connecting terminals being projected from the outer surface of said slide tube into contact with said mating connecting terminal patterns.

13. The adapter device according to claim 12 comprising slide tube biasing means biasing said slide tube in one direction relative to said shank, said connecting section being accommodated in said battery container with said slide tube being moved in the other direction against said slide tube biasing means on insertion of said connecting section into said battery housing section.

14. The adapted device according to claim 12 wherein said projection means comprises a connecting terminal holder holding said connecting terminals through a plurality of through-holes, said connecting terminal holder being movable relative to said shank in the moving direction of said slide tube and in the direction normal to said moving direction, and connecting terminal biasing means for pressing said connecting terminals outwards in a direction normal to the inserting direction of said connecting section by a flexible print base plate or substrate electrically connected to said electronic circuit.

15. The adapter device according to claim 14 wherein said connecting terminal biasing means comprise a comb-shaped spring plate member having a plurality of separate resilient pieces respectively associated with said connecting terminals.

16. The adapter device according to claim 14 wherein at leat a pair of guide pins provided on said connecting terminal holder is guided along cam grooves formed in said shank whereby said connecting terminal holder in moved in the moving direction of said slide tube and in a direction normal to said moving direction.

17. The adapter according to claim 12 comprising a positioning projection on the outer surface of said slide tube, said positioning projection engaging in a mating positioning recess formed on the inner side of said battery container along the direction of insertion of said connecting section into said battery housing section for positioning said connecting section relative to said battery housing section.

18. The adapter device according to claim 17 wherein said through-holes are arranged with respect to said mating connecting terminal patterns arrayed in said mating positioning recesses, said positioning projections of the slide tube projecting into said connecting terminals.

* * * * *